Patented Dec. 9, 1952

2,621,171

UNITED STATES PATENT OFFICE 2,621,171

PROCESS FOR POLYMERIZING ALPHA-METHYL STYRENE

Giffin D. Jones, Midland, Mich., assignor to The Dow Chemical Company, Midland, Mich., a corporation of Delaware No Drawing. Application October 31, 1949, Serial No. 124,729

4 Claims. (Cl. 260—93.5)

This invention concerns an improved process for making high polymers of alpha-methyl styrene.

It is known to polymerize alpha-methyl styrene in the presence of an ionic type polymerization catalyst, e. g. aluminum chloride or boron trifluoride. The polymers range from mobile liquids to hard brittle solids, depending for the most part upon the temperature at which the polymerization is carried out. In order to obtain a solid polymer of alpha-methyl styrene, which polymer has a relatively high molecular weight, i. e. a molecular weight of 20,000, or greater, employing the heretofore known procedure, the polymerization reaction is usually carried out at a temperature of minus 100° C., or below, in the presence of an inert liquid medium, which is required because such temperatures are far lower than the freezing point of alpha-methyl styrene. When attempt is made to polymerize alpha-methyl styrene by heating the same in the presence of sulfuric acid, there is usually obtained a product consisting principally of the dimers and trimers of alpha-methyl styrene. Per-oxygen compounds such as benzoyl peroxide or tertiary-butyl peroxide apparently cause little, if any, polymerization of alpha-methyl styrene.

There is need of a process for making high molecular weight polymers of alpha-methyl styrene by procedure which permits the polymerization reaction to be carried out in the absence of inert liquid media and at temperatures which avoid the use of refrigerants. Such procedure would not only render production of the polymer less costly, but may be used to prepare high polymers of alpha-methyl styrene which are especially valuable for certain uses, e. g. as electrical insulating material.

It has now been discovered that alpha-methyl styrene readily polymerizes in bulk, i. e in the substantial absence of inert liquid media, at between room temperature, or thereabout, and the freezing point of water, while in admixture with finely divided metallic sodium, to form a solid high polymer having a molecular weight corresponding to an intrinsic viscosity in toluene of 0.4 or greater. Such solid polymers of alpha-methyl styrene have molecular weights in the order of 50,000, or greater.

It is important that the polymerization reaction be carried out at temperatures within the range of from 0° to 30° C., preferably from 10° to 25° C., in order to obtain solid higher polymers of alpha-methyl styrene which polymers have a molecular weight of 50,000, or greater. Alpha-methyl styrene may be polymerized at temperatures somewhat higher, or lower, than those just stated, while in contact with metallic sodium, but the polymers are usually mobile to viscous liquids, or solids of low molecular weight when prepared at higher temperatures, e. g. at 35°–40° C., and at temperatures below 0° C. the rate of polymerization is undesirably low. At temperatures substantially higher or lower than those just stated, e. g. at a temperature of 60° C. or a temperature of minus 18° C., alpha-methyl styrene is not polymerized by contact with metallic sodium.

The molecular weight of the polymer appears to be independent of the amount of polymer formed, or of the amount of sodium employed as catalyst, but is dependent for the most part upon the temperature at which the polymerization reaction is carried out. The solid polymers prepared by maintaining alpha-methyl styrene, in admixture with finely divided metallic sodium at a temperature within the range of from 0° to 30° C., all have molecular weights corresponding to an intrinsic viscosity in toluene of 0.4, or greater. Molecular weight determinations by measuring the light scattering of a dilute solution of the polymers in methyl ethyl ketone have indicated that the polymers have a molecular weight greater than 50,000. Such method of measuring the molecular weight of high polymers, e. g. polystyrene, is well known and need not be described here.

It may be mentioned that attempts to polymerize the nuclear substituted homologues of alpha-methyl styrene, e. g. para-methyl-alpha-methyl styrene, by the procedure just described, have all resulted in failure to obtain a solid polymeric product. Apparently, sodium causes little, if any, polymerization of such homologues.

The proportion of metallic sodium to be employed as catalyst in carrying out the polymerization reaction may vary within wide limits. The sodium is usually employed in amounts corresponding to from 0.5 to 10 per cent, preferably from 1 to 4 per cent, by weight of the alpha-methyl styrene used, although larger amounts of the sodium may be employed.

The degree of subdivision of the metallic sodium has a pronounced effect on the rate of polymerization of the alpha-methyl styrene. In general, satisfactory results are obtained when the degree of subdivision of the sodium is such that the major portion of the powdered metal is composed of particles smaller than 1 millimeter, or less, in any diameter. However, sodium is effective in causing the polymerization regardless of the particle size or physical form in which it is employed, and larger particles or granules of sodium can be used.

The sodium metal may be prepared in finely divided form by any usual manner such as by dispersing the sodium metal in hot toluene, xylene, ethylbenzene, or a paraffin hydrocarbon, with vigorous agitation and cooling the dispersion to solidify the sodium particles, or by spraying, or extruding, the sodium through suitable orifices, or nozzles, preferably in the absence of air or oxygen.

The alpha-methyl styrene employed in the reaction should be substantially free of inert material, i. e. it should have a purity of 95 per cent or more. Solid polymers of high molecular weight, i. e. having a molecular weight corresponding to an intrinsic viscosity in toluene of 0.4 or greater, have been prepared from alpha-methyl styrene containing approximately 5 per cent by weight of ethylbenzene as inert diluent. However, it is important that the alpha-methyl styrene be protected against prolonged contact with air, or oxygen, prior to and during the polymerization reaction in order to obtain polymers of greatest molecular weight. The presence of freely absorbed oxygen, or of compounds containing the carbonyl group, e. g. aldehydes or ketones, in admixture with the alpha-methyl styrene results in the formation of a polymer having a molecular weight lower than is obtained in the absence of such substances. Best results are obtained by distilling the alpha-methyl styrene just prior to polymerization of the same, or by distilling the alpha-methyl styrene and storing it for short periods of time, e. g. for a time of one week or less, out of contact with air, or oxygen, prior to use.

The polymerization reaction may be carried out in the absence of air, or oxygen, by contacting the mixture with an inert gas such as nitrogen, helium, or methane, although the polymerization reaction is preferably carried out in vacuum, or in contact with vapors of the alpha-methyl styrene, by sealing the reactants under vacuum in a suitable vessel, or by maintaining the mixture under vacuum while carrying out the polymerization reaction. Best results are obtained by sealing freshly distilled alpha-methyl styrene and finely divided metallic sodium, in the desired proportions, in a vessel and agitating the mixture at a reaction temperature until the desired degree of polymerization is obtained.

The polymerization reaction may be continued until nearly all of the alpha-methyl styrene is polymerized, i. e. until a hard solid resin is obtained, but the reaction is sluggish in its final stages due to difficulty of stirring the highly viscous or solidified material. The polymerization is usually discontinued when a sufficient amount of the alpha-methyl styrene has been polymerized to form a viscous liquid capable of being stirred or otherwise agitated.

The polymeric alpha-methyl styrene may be recovered from the reaction mixture in any of several ways. For instance, the viscous liquid or a solution of the viscous liquid in a solvent such as benzene, or toluene, may be treated with a lower alkyl alcohol such as methanol, ethanol, or isopropanol, to precipitate the polymer and destroy the sodium catalyst, e. g. by reaction of the alcohol with the sodium to form a sodium alcoholate, and free the polymer of sodium metal, or the solid polymer may be dissolved in an aromatic hydrocarbon solvent such as toluene, benzene, xylene, or ethylbenzene, and the polymer precipitated by mixing the solution with a lower alkyl alcohol.

In a preferred practice of the invention, the alpha-methyl styrene is maintained at a polymerization temperature in contact with the finely divided metallic sodium until a viscous fluid solution of the polymer and monomer is obtained, i. e. until from about 20 to 35 per cent by weight of the alpha-methyl styrene is polymerized. The fluid solution is then mixed with a lower alkyl alcohol and agitated to destroy the catalyst and precipitate the polymer. The polymer is separated by filtering the mixture and is washed with water and dried. The polymer may be further purified by dissolving the same in an aromatic hydrocarbon, e. g. benzene, toluene, or ethylbenzene, and again precipitated with an alcohol. The unreacted alpha-methyl styrene may be separated from the filtrate and purified by usual manner, e. g. fractional distillation. The alpha-methyl styrene thus recovered may be reused in the process.

The following examples illustrate practice of the invention, but are not to be construed as limiting the scope thereof.

*Example 1*

A charge of 180 grams of alpha-methyl styrene, together with 1.8 grams of finely divided metallic sodium as polymerization catalyst, was sealed in a glass pressure bottle. The mixture was agitated and maintained at a temperature of about 25° C., over a period of 115 hours. The reaction mixture, a viscous solution, was poured into 1 liter of vigorously agitated methyl alcohol to destroy the sodium and to precipitate the polymer. The polymer was separated by filtering the mixture. It was then washed successively with water, with an aqueous 6 normal solution of hydrochloric acid, and again with water, and dried. There was obtained 106 grams of a light brown powder. The polymer was compression molded to form a transparent amber colored plate. A 10 weight per cent solution of the polymer in toluene had an absolute viscosity of 6.47 centipoises at 25° C. The intrinsic viscosity of the polymer in toluene was 0.42. The intrinsic viscosity was determined from viscosity measurements on solutions consisting of 0.25, 0.5, and 1.0 per cent by weight of the polymer, respectively, in toluene at 25° C.

*Example 2*

A charge of 180 grams of alpha-methyl styrene, together with 3.6 grams of finely divided metallic sodium, was sealed in a glass tube. The mixture was agitated and maintained at a temperature of 10° C. over a period of 115 hours. The reaction mixture, a clear yellow solution, was poured into about 1.5 liters of vigorously agitated ethyl alcohol. The polymer was separated as a white fibrous material by filtering the mixture and was dried in an oven at a temperature of about 80° C. There was obtained 43 grams of dry polymer which could be molded to form a slightly opaque brittle solid. A 10 weight per cent solution of the polymer in toluene had an absolute viscosity of 14.39 centipoises at 25° C. The intrinsic viscosity was 0.67.

A similar charge of alpha-methyl styrene was polymerized in admixture with 2 per cent by weight of finely divided metallic sodium by heating the mixture to a temperature of 55° C. over a period of 67 hours. There was obtained 39.5 grams of a white polymer having an intrinsic viscosity of 0.3. For further comparative purposes a similar charge of alpha-methyl styrene in admixture with 2 per cent by weight of finely divided metallic sodium, was maintained at a temperature of minus 18° C., over a period of 118 hours. No polymer was obtained.

A charge of 180 grams of para-methyl-alpha-methyl styrene and 3.6 grams of finely divided metallic sodium was sealed in a glass bottle and maintained at a temperature of about 25° C. over a period of 264 hours. Thereafter, the mixture was removed from the bottle and a portion thereof poured into approximately 5 volumes of ethyl alcohol. There was no precipitate of polymer.

*Example 3*

A charge of 200 grams of alpha-methyl styrene, together with 1.8 grams of finely divided metallic sodium was sealed in a glass pressure bottle. The mixture was agitated and maintained at a temperature of about 25° C. over a period of 139 hours. The reaction mixture was a viscous liquid. It was poured into approximately 2 liters of vigorously agitated ethyl alcohol to precipitate the polymer and destroy the sodium. The polymer was separated by filtering the mixture, and was washed with water and dried. There was obtained 50 grams of a white fibrous polymer which could be compression molded to form a glass clear sheet. A 10 weight per cent solution of the polymer in toluene had an absolute viscosity of 9.2 centipoises at 25° C. The intrinsic viscosity was 0.526. The polymer had a molecular weight of approximately 101,000 as determined by measuring the light scattering of dilute solutions of the polymer in methyl ethyl ketone.

Other modes of applying the principle of the invention may be employed instead of those explained, change being made as regards the step or steps herein employed, provided the step or steps stated in any of the following claims or the equivalent of such step or steps be employed.

I claim:

1. In a process for polymerizing alpha-methyl styrene to form a solid polymer having a molecular weight corresponding to an intrinsic viscosity in toluene greater than 0.4, the improvement which consists in polymerizing the alpha-methyl styrene at a temperature between 0° and 30° C. while in admixture with finely divided metallic sodium and in the substantial absence of an inert liquid medium.

2. A process for making a solid homopolymer of alpha-methyl styrene, which polymer has an average molecular weight corresponding to an intrinsic viscosity in toluene greater than 0.4, which consists in polymerizing alpha-methyl styrene at temperatures between 0° and 30° C. while in admixture with from 0.5 to 10 per cent by weight of finely divided metallic sodium and in the substantial absence of an inert liquid medium until a solution containing at least 20 per cent by weight of polymer is obtained, then freeing the metallic sodium from the polymer by mixing the solution with a lower alkyl alcohol containing from 1 to 3 carbon atoms in amount sufficient to precipitate the polymer and separating the polymer from the liquid.

3. A process for making a solid homopolymer of alpha-methyl styrene which polymer has an average molecular weight corresponding to an intrinsic viscosity in toluene greater than 0.4, which consists in polymerizing alpha-methyl styrene at temperatures between 0° and 30° C. while in admixture with from 0.5 to 10 per cent by weight of finely divided metallic sodium and in the substantial absence of an inert liquid medium until a solid polymeric product is obtained, then freeing the sodium from the polymer by dissolving the polymeric product in a liquid aromatic hydrocarbon, mixing the solution with a lower alkyl alcohol containing from 1 to 3 carbon atoms in amount sufficient to precipitate the polymer and separating the polymer from the liquid.

4. A process for making a solid homopolymer of alpha-methyl styrene which polymer has an average molecular weight corresponding to an intrinsic viscosity in toluene greater than 0.4, which consists in polymerizing alpha-methyl styrene at temperatures between 10° and 25° C. while in admixture with from 0.5 to 10 per cent by weight of finely divided metallic sodium and in the substantial absence of an inert liquid medium until a solution containing from 20 to 35 per cent by weight of polymer is obtained, then freeing the metallic sodium from the polymer by mixing the solution with a lower alkyl alcohol containing from 1 to 3 carbon atoms in amount sufficient to precipitate the polymer and separating the polymer from the liquid.

GIFFIN D. JONES.

REFERENCES CITED

The following references are of record in the file of this patent:

UNITED STATES PATENTS

| Number | Name | Date |
|---|---|---|
| 2,327,082 | Walker | Aug. 17, 1943 |
| 2,458,378 | Herbolsheimer | Jan. 4, 1949 |
| 2,506,857 | Crouch | May 9, 1950 |

OTHER REFERENCES

Krakau: Berichte 11(I), page 1260 (1878).